Nov. 17, 1942.   J. W. CAVES   2,302,005
GEAR SHIFT
Filed March 18, 1939   2 Sheets-Sheet 1

INVENTOR.
JAMES WALTER CAVES
BY
ATTORNEY.

Nov. 17, 1942.  J. W. CAVES  2,302,005
GEAR SHIFT
Filed March 18, 1939  2 Sheets-Sheet 2
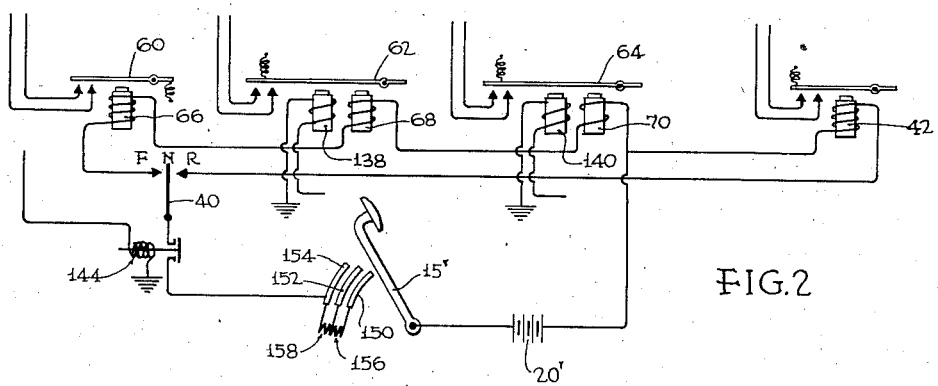
FIG. 2
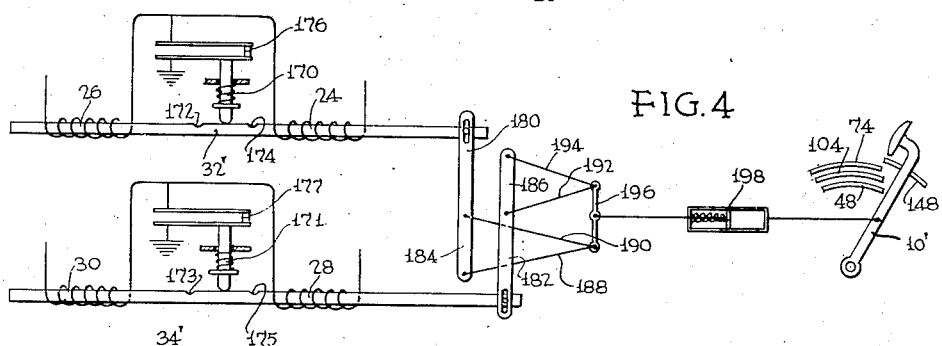
FIG. 4
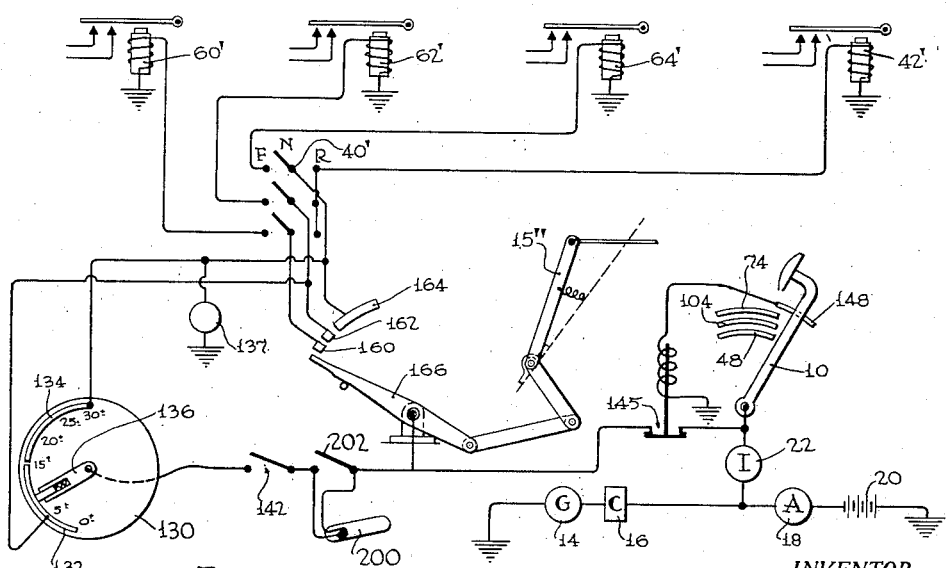
FIG. 3
INVENTOR:
JAMES WALTER CAVES
BY 
ATTORNEY Patented Nov. 17, 1942

2,302,005

UNITED STATES PATENT OFFICE 2,302,005

GEAR SHIFT

James Walter Caves, Phelps, N. Y.

Application March 18, 1939, Serial No. 262,619

21 Claims. (Cl. 192—.01)

The present invention relates to gear shifting devices and more particularly to the automatic and improved manual operation of automotive vehicle gear shifts.

In automotive vehicle gear shifts it has been the practice to provide a manually operable gear shift lever for shifting gears, and whose movement to shift gears must be coordinated with movements of the clutch and engine throttle or accelerator. Operation of these three controls at once leaves the operator with one hand to steer the vehicle during gear shift operations, and as will be well understood in the art, there are other controls which may even occupy the one free hand, such as choke, hand brake, hand throttle and the like.

The present invention is adapted to overcome the necessity for a manual gear shift lever, by employing the relatively simple movements of clutch and accelerator operating pedals, in conjunction with power shifting to accomplish this purpose, and thereby eliminate an unnecessary control. Additionally, the invention provides for automatic shifting of gears either manually through combined manipulation of clutch and throttle or accelerator or in response to vehicle speed, by manipulation of the clutch alone.

Accordingly an object of the invention is to provide a gear selector mechanism responsive to clutch and throttle manipulation and vehicle speed.

Another object of the invention is to provide a gear selector mechanism of the type described together with interlocking mechanism to effect gear changes desired and prevent accidental unintended gear engagements.

A further object of the invention is to provide a gear selector mechanism primarily operable by selective manipulation of the throttle or accelerator through an initial range of movement.

A still further object of the invention is to provide a gear selector mechanism actuated by electro-magnetic solenoids and controlled through the combined movements of clutch and throttle, the former through its initial pre-clutch engaging movement, and the latter through its initial movement in a throttle opening direction.

Yet another object of the invention is to provide an electric control for a gear selector mechanism wherein the instantaneous positioning of the throttle combined with movement of the clutch pedal determines a gear ratio to be selected, regardless of subsequent throttle manipulations.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings, wherein similar reference characters refer to similar parts throughout the several views:

Fig. 2 is a fragmentary portion of the circuit of Figure 1 illustrating a modification thereof.

Fig. 3 is a fragmentary portion of the circuit of Figure 1 and illustrating another modification thereof.

Fig. 4 is a modified fragmentary portion of the circuit of Figure 1 combined with a mechanical neutralizing linkage.

Figure 1:
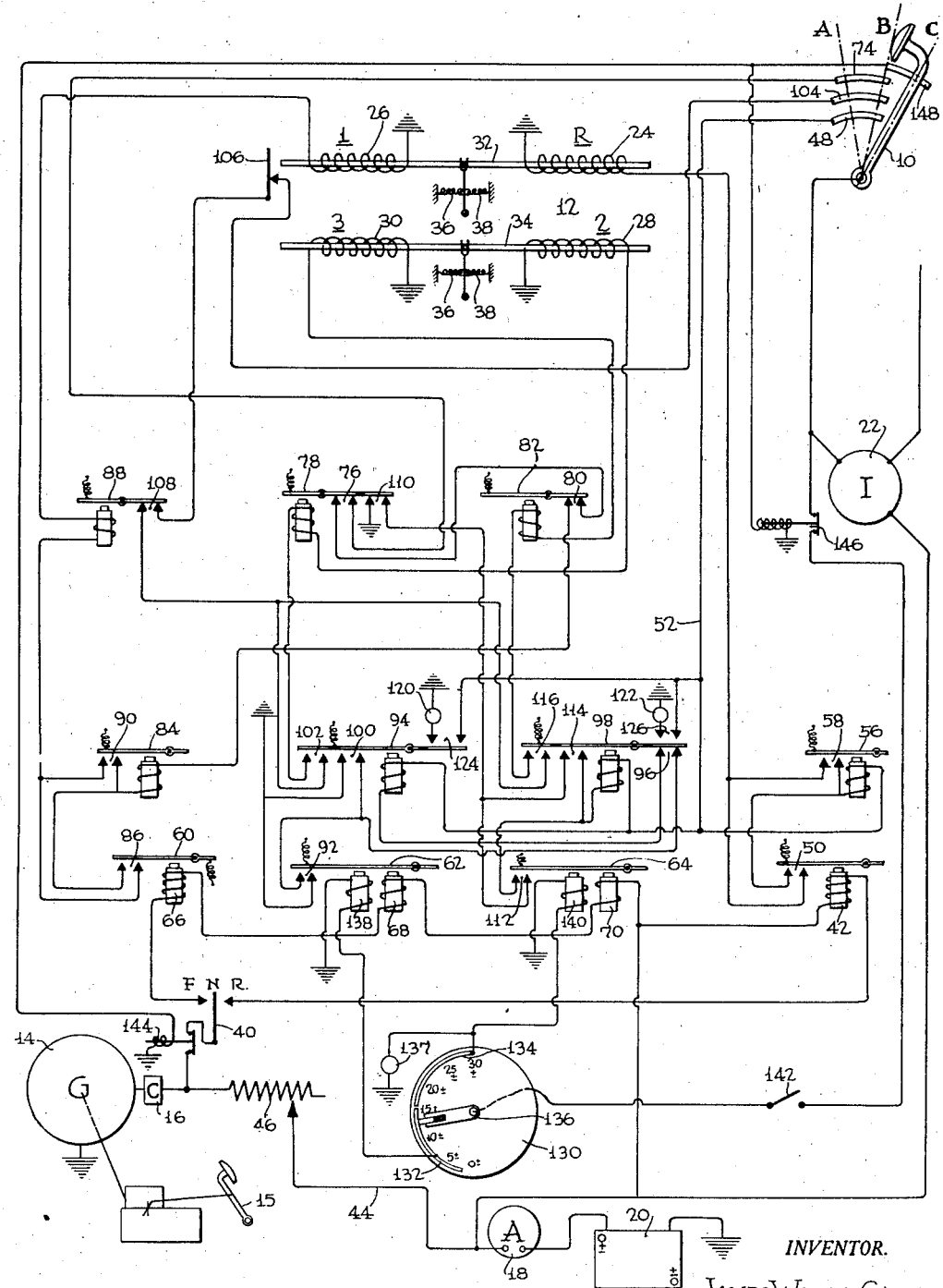
Fig. 1 is a circuit diagram generally showing a preferred form of the invention.

Referring to Fig. 1 in which the parts are illustrated diagrammatically in a preferred circuit, there is shown a clutch pedal 10 usually found on motor vehicles of the internal combusion engine type wherein selective gear transmissions are employed, the clutch being located between the engine and transmission. Also diagrammatically shown is a transmission 12 of the selective interchangeable gear type having provision for three speeds forward and one reverse. Preferably the forward speeds and particularly intermediate and high gears are of the syncro-mesh type whereby automatic gear or gear clutch meshing is effected. There is also illustrated diagrammatically the customary generator 14 connected through a cut-out 16 to a charging rate indicator or ammeter 18 and storage battery 20, together with the usual connection to the ignition switch 22, and ground connections.

To provide for power shifting of gears, each of the gear positions are provided with shifting solenoids 24, 26, 28 and 30, for shifting reverse and forward speeds low (1st), intermediate (2nd) and high (3rd) gear respectively, as will be well understood in the art. The shift rails, diagrammatically shown as 32 and 34, except when shifted to a gear engaging position by one of the solenoids 24—30, are retained in neutral position by spring returns 36 and 38 the same being sufficiently strong to return any shift rail to neutral position and retain it there in the absence of one of the solenoids being energized.

In order to energize the various shifting solenoids to select a particular gear ratio, without the actual operation of a mechanical shift lever such as is commonly employed and which adds to the number of controls already greater in number than can be simultaneously controlled by a single operator, there is first provided a forward and reverse switch 40, the movement of which determines the direction of movement of the vehicle.

To best understand one of the features of the invention without the necessity of considering the interlocking circuits, the reverse gear will be described first. To energize the reverse solenoid 24, the switch 40 is thrown to the right, and as soon as the speed of the generator 14 is increased sufficiently to send a charging current to the battery and close the cutout by opening the engine throttle 15, the accelerator controlled or generator relay 42 is energized, since it is in parallel with the generator battery charging connection 44, extending from the cutout 16 to the charging ammeter 18. The charging current will divide part passing through the relay magnet 42, and part through the connection 44, the latter having some inherent resistance, or extra resistance 46 inserted therein.

With the clutch 19 in the disengaged position as shown, nothing will occur, but as the operator initially moves the clutch toward engaging position, connection with the contact 48, and the clutch, which for the sake of simplicity is illustrated as a switch blade is effected. Since the armature of the relay 42 has closed contacts 50 associated therewith, current may travel from the battery 20, through the ammeter 18, the ignition switch 22, (which is closed since the engine is running) through the contact 48, thence through lead 52 through the winding of a holding relay 56, contacts 50 of relay 42 and thence through the reverse solenoid 24 to ground. Immediately, the shift rail 32 is moved to the right and reverse gear is engaged. The relay 56, being energized causes its armature to close contacts 58, the same being in parallel with contacts 50, and thereafter, whether or not the engine speed is reduced so as to cause the cutout 16 to open, thus deenergizing relay 42, the selected gear engagement is maintained by the holding relay 56.

The clutch may thereupon be engaged and the vehicle caused to move in reverse, or the clutch may be depressed fully to open the contact 48 in which case the circuit through the holding relay 56 will be broken and the reverse gear and shift rail 32 returned to neutral by the return springs 36—38. Thus it will appear that if the clutch pedal is moved initially toward engaged position, a momentary touch of the accelerator pedal 15 will cause reverse gear to be selected.

To select forward speeds, a separate accelerator controlled or generator relay for each speed is provided. The accelerator controlled or generator relay for low gear is illustrated at 60, that for intermediate gear 62, and for high gear 64. Each is provided with an energizing magnet 66, 68, and 70 respectively, but in order to select any one of the magnets, the low gear magnet 66 is more sensitive than the intermediate gear magnet 68 and both are more sensitive than the high gear magnet. Diagrammatically, the number of turns has been shown as greatest on magnet 66 and least on magnet 70. Since the three magnets are connected in series and are adapted to be thrown in parallel with the charging connection 44 by throwing the switch 40 to the left, it will appear obvious that the relays 60, 62 and 64 will be successively operated as the charging rate increases, or as the engine speed increases, or as the accelerator or engine throttle is moved to increase the engine speed. These relays operate only when the clutch is disengaged, and consequently at this time the engine speed is proportional to the accelerator movement. Thus by skillfully positioning the accelerator pedal to cause the engine to idle at various speeds, either relay 60, relays 60 and 62, or relays 60, 62 and 64 may be caused to function.

Assuming it is desired to select low gear, the proper engine idling speed will be produced by touching the accelerator pedal to close relay 60. Then if the clutch pedal is initially moved toward engaged position sufficiently to make connection to a clutch pedal contact 74, current will flow from the live ignition switch which for the sake of simplicity will hereinafter be considered the source of current, through the clutch pedal 10, contact 74, through closed contacts 76 of series relay 78, through closed contacts 80 of series relay 82 through the holding relay 84, through closed contacts 86 of generator relay 60 and thence through series relay 88 to low gear solenoid 26 to ground, thereby causing a shift to low gear. Passage of current through holding relay 84 will cause the contacts 90 thereof to be closed thus short circuiting the contacts 86 of the generator relay 60, so that first gear will be retained regardless of whether the engine speed is thereafter reduced.

No other gear ratio may thereafter be selected so long as the contact 74 with the clutch pedal is maintained. Should the vehicle be started in low gear and considerable speed developed, then a shift to second gear will be desirable. For effecting such a change, the clutch pedal is depressed sufficiently to disengage contact 74 thereby opening the previously described circuit including the low gear solenoid 26, and the gears are spring shifted to neutral. Upon speeding the engine up by a touch of the accelerator pedal so as to energize relays 60 and 62, but not 64, armature contacts 92 will be closed, and if the clutch pedal is initially positioned to close contact 48, current will flow through circuit 52, energizing holding relay 94, through contacts 96 on holding relay 98, thence through closed contacts 92 of generator relay 62 to ground. With the energization of holding relay 94, contacts 100 will be closed, short circuiting contacts 92 of the generator relay 62, thereby holding relay 94 energized. At the same time contacts 102 of holding relay 94 will be closed. As soon as the clutch pedal is moved to a position to make a connection to intermediate contact 104, current will flow through closed low gear safety switch 106, closed contacts 108 of the series relay 88, thence through contacts 102, through the winding of series relay 78 to the second gear solenoid 28 and to ground, thereby effecting engagement of second gear. Operation of the first gear solenoid is prevented by the opening of contacts 76 by the energizing of series relay 78, a circuit essential to the engagement of first gear, as previously described. Operation of the third gear solenoid at this time is prevented by the fact that holding relay 98 is de-energized and the high gear accelerator or generator relay 64 is ineffective to energize the holding relay 98 since an essential circuit thereto is broken by the contacts 110 of the energized series relay 78 being broken. Second gear relation will be maintained until the clutch is disengaged and additionally moved sufficiently to break the contact 104.

For the purpose of selecting high gear, accelerator controlled or generator relays 60, 62 and 64 are all energized by speeding up the engine by a touch of the accelerator pedal, this time a little faster than that required for second gear. The contacts 112 of the relay 64 are thereby closed and upon the clutch pedal making connection with contact 48, holding relay 98 will be energized through connection 52, contacts 112, of the generator relay 64, closed contacts 110 of the series relay 78 and thence to ground. The energizing of holding relay 98 closes contacts 114, short circuited across contacts 112, and also closes contacts 116. As soon as the clutch pedal makes connection through contact 104 a circuit is completed through low gear safety switch 106, closed contacts 108 of series relay 88, closed contacts 116 of holding relay 98, energizing relay 82 and high gear solenoid 30, thereby effecting a shift into high gear.

No other gear relation could have been effected since energizing series relay 82, opened contacts 80 preventing flow of current to low gear holding relay 84 and low gear solenoid 26. Energizing holding relay 98, also opened contacts 96, preventing the functioning of intermediate gear holding relay 94, and preventing the closing of contacts 102, essential to selection of second gear.

In order to facilitate selection of a particular gear, dash operated signal lamps 120 and 122 may be provided, the former acting upon the energization of holding relay 94 through contacts 124, to close a circuit to the connection 52 through contact 48 to the source of current at the ignition switch 22, and the other acting upon the energizing of holding relay 98 through contacts 126, to complete a circuit similarly to the source 22. Thus if the clutch pedal is moved toward engagement and contact 74 is made and the throttle opened, relay 60 is first energized, and once energized, energizes relay 88, opening contacts 108 to prevent flow of current from contact 104, which flow is essential to intermediate gear selection, as well as high gear. If contact 74 is not made, but contact 48 is made, then by controlling engine idling speed, will cause signal lamps 120 or 122 to illuminate depending on whether intermediate gear or high gear will be selected upon the closing of contact 104. This will assist the operator in choosing the proper engine speed to select a desired gear ratio.

Once low gear is engaged shift rail 32 opens the safety switch 106 thereby producing an additional open circuit in the connection to clutch contact 104, essential to the energizing of intermediate or high gear solenoids 28 and 30 respectively.

While the need for a mechanical gear shift lever has thus been eliminated, by substituting exercise of control over clutch pedal position and throttle, which in practice the average driver is highly skilled at, it may be also desirable to render the shifting or selection of intermediate and high gears automatic and a function of speed of the vehicle. For this purpose a vehicle speed indicator and switch, or speed operated switch such as diagrammatically illustrated at 130 may be employed. Such a switch may have a pair of segmental contacts 132 and 134, one of which is adapted to be connected to a brush 136 during a speed range of 3 to 15 miles per hour, and the other, all speeds in excess thereof. Obviously the ranges may be varied to suit temperament and customary speeds obtained in intermediate gear.

Each of the relays 62 and 64 are provided with an additional magnet 138 and 140 respectively, connected to the segmental contacts 132 and 134, and the brush 136 is connected to the source of energy, the ignition switch 22 through a manually operated switch 142. Each of the magnets 138 and 140 are grounded as shown so that either one or the other of relays 62 or 64 may be energized independent of accelerator control and thereby be dependent automatically upon speed of the vehicle. Thus, initially low gear may be selected by throttle manipulation and second and high gears automatically selected in response to vehicle speed, or by throttle control if desired. A signal light 137 is provided to indicate when high gear speed is reached.

In order to eliminate the possibility of accidental gear clashing as might occur should the clutch be engaged, and the gears in neutral, as might occur should the vehicle be travelling at a speed greater than 3 miles per hour and the switch 142 closed, or the accelerator pedal touched as in racing the engine, relays 146 and 144 are provided to open the automatic speed control circuit, and the generator relay bridging circuit unless the clutch is depressed sufficiently to disengage the engine from the gears. For this purpose a contact bar 148 adapted to engage the clutch pedal 10 during its disengaged range of movement is connected to the relays 144 and 146 to energize and close the same whenever the clutch is in such range of disengaged movement.

While the foregoing circuit, as respects the accelerator controlled or generator relays 60, 62 and 64 readily adapts itself for connection into the generator battery circuit of the usual automotive vehicle, with perhaps the sole addition of the slight resistance 46, a modified form of the accelerator controlled or generator relay circuit is illustrated in Fig. 2, wherein the positioning of the accelerator pedal is rigidly fixed for the selection of various speeds and is therefore separated from any function of motor speed and generator charging rate. In this modification, the accelerator pedal, as diagrammatically shown, in its initial range of movement, contacts seriatim, contact bars 150, 152 and 154, which are connected together by intervening resistors 156 and 158. Completion of the circuit through the usual car battery 20', the magnets 66, 68 and 70, or 42, forward and reverse switch 40 and relay 144, is effected by initially depressing the accelerator pedal 15'. The resistances 156 and 158 are so chosen with respect to the relay magnets 66, 68 and 70 so as to cause only the most sensitive relay 60 to function when both resistances are in circuit, as would be the case with only slight movement of the accelerator pedal into contact 150 only. Upon slight further movement of the accelerator pedal into contact 152, thus short circuiting resistor 156, the relays 60 and 62 both function, and upon slight further depression of the accelerator pedal into contact 154, both resistors 156 and 158 will be short circuited and relays 60, 62 and 64 operated. In reverse, connection to any of contacts 150, 152 and 154 will be sufficient to energize relay 42. It will be understood that relays 60, 62, 64 and 42 and 144 are identical to the relays in the circuit of Figure 1 and control the same circuits as therein shown, the remainder of the circuit being eliminated in order to avoid duplication as well as to emphasize the modification. Similarly the automatic vehicle speed control may be employed in conjunction with magnets 138 and 140 of relays 62 and 74, just as illustrated in Fig. 1.

Another modified form of the invention is illustrated in Fig. 3 in which the relays 60, 62, 64 and 42 are replaced by relays having a single magnet, each magnet of which has the same characteristics and sensitivity. In this instance relays 60', 62' and 64', and relay 42' are connected to opposite sides of a three pole double throw switch 40', adapted to select forward or reverse gears. The three blades of the switch 40' are in turn connected to contacts 160, 162 and 164 of an accelerator operated switch arm 166, which initially engages contacts 160, 162 and 164 in seriatim upon initial accelerator movement. In parallel with contacts 162 and 164 is the speedometer controller 130, having its segments 132 and 134 connected to contacts 162 and 164 respectively. Thus the double magnets 68 and 138, and 70 and 140 are combined in a single winding. The speed controlled brush connection 136 through the cutout switch 142 is connected to the accelerator operated switch arm 166 and thence through an engaged clutch cutout relay 145 to the ignition switch 22 and thence through the battery 20 to ground. The signal lamp 137 is similarly provided as in Fig. 1. As in Fig. 2, the remainder of the circuit from the clutch pedal control contacts 48, 104, 74, and the circuits controlled by relays 60', 62', 64' and 42' are identical to those controlled by relays 60, 62, 64 and 42 of Fig. 1 and are not duplicated here to avoid unnecessary repetition and in order to make the essential features of this modification more clear. It should appear clear that the general mode of operation of each of the modifications is substantially the same.

In order to eliminate battery drain as would be incident to the continuous operation of the shifting solenoids of Fig. 1, while in gear, the modification of Fig. 4 may be employed. By removing the centering and neutralizing springs 36 and 38, and providing a mechanical or other equivalent neutralizer, dependent upon clutch pedal disengagement movement, the solenoid circuits may be broken upon effecting any selected gear engagement. For this purpose, the spring pressed shift lock pins 170 and 171 may be arranged to drop into shift rail recesses 172 and 174 and 173 and 175, upon the suitable movement to gear engaged positions. The movement of the lock pins into locking position is so arranged as to open the circuit to ground of the respective solenoids employed for shifting that particular shift rail. The switch leaves 176 and 177 interposed between the solenoids 26 and 24 and 30 and 28, respectively, and their ground connections, are adapted to separate and open the ground circuit upon locking movement of the pins 170 or 171 thereby eliminating battery drain while in gear.

To neutralize the gears, a lever and link arrangement adapted for operation by the clutch pedal is illustrated. Each shift rail is provided with a lever 180, 182, fulcrumed at 184 and 186, respectively. The levers are adapted to be moved to the neutral positions shown by tensioning the flexible links 188, 190, 192 and 194 through the balancing lever 196 and the yielding connection 198 extending to the clutch pedal 10'.

Operation of above-described circuits has to a considerable extent been clearly set forth in conjunction with the description thereof so as to make the function of the various parts at once clear. However, the operation will be now made clear by a brief description thereof. Referring to Fig. 1 it will appear that the source of energy, except for the relay circuits in parallel with the generator battery charging connection 44, is derived from the ignition switch 22. Assuming the clutch pedal 10 is in the position A, disconnected from contact 148, and the ignition switch closed, it will appear clear that relays 144 and 146 will be open thereby preventing operation of any of the circuits.

Assuming the clutch pedal be depressed to the position shown at C, as soon as it passed position B, the clutch plates lose contact and the clutch is released, contact 148 becomes energized causing relays 144 and 146 to close their respective circuits. Then by throwing dash switch 40 from the central neutral position shown to F or R, respectively, the operation of gear shift may be effected upon suitable manipulation of throttle and clutch. For reverse, it is merely necessary that the clutch pedal connect with contact 48, the switch 40 be thrown to "R" and the generator speeded up by accelerator pedal control to cause generated current to actuate relay 42.

For forward speeds, low gear may be selected by throwing the dash switch 40 to F, causing the generator to rotate fast enough to send a charging current strong enough to actuate relay 60 to the exclusion of relays 62 and 64, and simultaneously move the clutch toward engaging position to connect with contact 74. If the clutch is connected with contact 74, and the engine is speeded up carelessly, relay 60 will be first to function as the charging current increases and will immediately operate relays 84 and 88 to prevent subsequent operation of relays 62 and 64 from effecting operation of intermediate or high gears, and low gear will immediately be engaged.

If it be desired to quickly shift to second gear, then the clutch may be disengaged and moved sufficiently far to open contact 74, but maintain a circuit through contact 104. As soon as the generator charging current is established at such a rate as to cause relay 62 to function, and as soon as low gear is neutralized closing safety switch 106, intermediate gear will be selected. Had it been desired to engage high gear, it would have merely been necessary to effect operation of relay 64 through throttle manipulation while moving the disengaged clutch pedal so as to break contact 104 but maintain contact 48. Under these circumstances upon the operation of relay 98, the engaging movement of the clutch pedal into contact 104 would thereupon cause engagement of high gear. Selection of the proper motor speed and charging rate is facilitated by the signals 120 and 122, which it will be observed are dependent operations of the respective relays 94 and 98. Relay 98, for example, if energized opens contacts 96 deenergizing relay 94. Once relay 98 is energized, deenergizing relay 64, unless clutch contact 48 is broken, will have no effect. Thus once a gear ratio is selected, as indicated by the lamp 120, or 122, the subsequent slowing up of the engine and generator will not cause any material change, but by breaking contact 48, any desired ratio may be established de novo.

If the switch 142 be closed, then the automatic selection of relay 62 or 64 will be effected in accordance with vehicle speed, one difference being however that relay 64 is operated without relay 62. Hence any temporary energization of relay 94, prior to opening of contacts 96 by relay 98, as in the case of high gear selection, is avoided.

Operation of Figure 2, should appear obvious from the description and is in effect identical with that of Fig. 1, except, positive positioning of the accelerator pedal 15' positively selects the corresponding relay. Thus engine speed is removed as a controlling factor. This may be especially desirable in cases where automatic chokes and fast idles are employed for initial engine operation.

In Fig. 3 operation is again identical to Figs. 1 and 2, with the advantages of Fig. 2. Since the relays 60', 62', and 64' are entirely excited through the relay 145, but a single relay is required, but separate relays 144 and 146 are preferably employed in Figs. 1 and 2 since variations in resistance through the series relays 60 and 62 and 64, might if combined with other circuits effect selection of the relays, although this might be avoided.

The operation of the neutralizing mechanism of Fig. 4, and the solenoid circuit opening switches 176 and 177 is believed obvious from the description. It will of course appear that the low and reverse rail 32' may be spring centered while the rail 34' may have the illustrated lock and switch, in which case the clutch would neutralize these gears (intermediate and high) by direct tension on cables 198 and 194. In practice, such a system would prove satisfactory since most of the time, either high or second gear is in use and battery drain from the relatively small use of low and reverse would be inconsequential.

If desired, and in order to automatically facilitate manual shifting of gears from a higher to a lower gear, as when proceeding down a steep grade, a mercury switch 200 adapted to open the speed controlled circuit may be inserted in series with switch 142 or even substituted therefore. In such a case, the switch would be arranged to open the circuit only when the car is proceeding down grade, and preferably a heavy down grade, thus making it safely possible to use automatic gear selection of intermediate and high, except while proceeding down grade, when manual selection is automatically provided for. Also a shunt switch 202 may be arranged around the mercury switch.

In engaging low gear it will appear to those skilled in operating standard automotive vehicles, that mere selection of the gear ratio by a touch on the throttle renders the completion of the selection substantially automatic in the normal operation of the clutch pedal. For example, in selecting low gear, the accelerator need merely be touched and the clutch put in the "feel" position, as all operators are unconsciously in the habit of doing. This feel position is just before the clutch plates touch, and the clutch when in this position completes a circuit through contact 74. If second gear is thereafter manually selected by throttle manipulation, and possibly the aid of signal lamp 120, engagement of the clutch automatically completes a circuit through contact 104, prior to contact 74, and the latter is thereby cut out. Less skill is required in engaging the clutch in second gear, and the mere closing of contact 104, automatically completes the shift to intermediate or second gear. If a shift from low to high is desired, then it is natural for the operator to speed the engine a little with clutch disengaged to select high or else upon leaving low gear, the engine is already rotating faster than usual and as it slows down would effect selection of high gear through relay 64, if the clutch be disengaged quickly. Thus automatically high gear selection is completed as the clutch makes connection to contact 104.

The fact that contacts 48, 104 and 74 are made in sequence as the clutch pedal is moved toward engaging position, and the fact that contact 74 is made almost as the critical clutch plate contacting position is reached, renders the clutch operation little different from ordinary operation, if any difference exists, and with the speed control, manipulation of the throttle is likewise reduced to natural ordinary movements since starting in low gear is preferably accompanied by a slight increase of engine idling speed.

It will readily appear that while the circuits have been shown in their preferred form, varying changes can be effected.

There has thus been described a novel gear shift control, both automatic and manual, adapted to obviate the necessity of a gear shift lever and adapted through movements substantially natural to the usual mode of operating a clutch and accelerator pedal to readily effect gear selection.

Although several modifications of the invention have been illustrated and described, it is to be understood that the invention is not to be limited thereto, but may be embodied in other equivalent arrangements and forms. As many changes may be made in the adaptation and arrangement of parts, for example the substitution of equivalent features in one modification for those of another, as will be apparent to those skilled in the art, reference being had to the appended claims for a definition of the limits of the invention.

What I claim is:

1. In an automotive vehicle gear shift, an engine having means for manually controlling the speed thereof, a transmission having a plurality of speed ratios, and a clutch interposed between said transmission and engine and having a manual control therefor, means associated with said transmission and dependent upon operation of each of said clutch control and the degree of operation of the speed controlling means for effecting selection of one or another of the speed ratios of said transmission in response to the position of the engine speed controlling means.

2. In an automotive vehicle gear shift, an engine having means for manually controlling the speed thereof, a transmission having a plurality of speed ratios, a clutch interposed between said transmission and engine and having a manual control therefor, and means responsive to vehicle speed, means associated with said transmission and dependent upon operation of each of said clutch control, speed controlling means and vehicle speed responsive means for effecting selection of one or another of the speed ratios of said transmission in response to the position and degree of movement of the engine speed controlling means, and said vehicle speed responsive means.

3. In an automotive vehicle gear shift, an engine having a throttle and an electric generator and battery charging circuit associated with and driven from said engine, said generator having a current output substantially proportional to engine speed through the lower ranges thereof, a transmission having a plurality of selectable gear ratios, a clutch interposed between said transmission and engine and having a control therefor, means responsive to the generator current output and operation of the clutch control for selecting one or another of said gear ratios.

4. In an automotive vehicle gear shift, an engine having a throttle and an electric generator and battery charging circuit associated with and driven from said engine, said generator having a current output substantially proportional to engine speed through the lower ranges thereof, a vehicle speed responsive means, a transmission having a plurality of selectable gear ratios, a clutch interposed between said transmission and engine and having a control therefor, means responsive to the generator current output and operation of the clutch control, and said vehicle speed responsive means for selecting one or another of said gear ratios.

5. Shifting mechanism for an automotive vehicle transmission having shiftable speed changing elements, comprising actuating mechanism differently operable upon said elements to effect different speed changes, a clutch and control therefor, a speedometer, an accelerator pedal, means dependent upon actuation of said clutch control and at will subject to manipulation of said accelerator pedal, or said speedometer to effect different speed changes.

6. Shifting mechanism for an automotive vehicle transmission having shiftable speed changing elements, comprising actuating mechanism differently operable upon said elements to effect different speed changes, a clutch and control therefor, a speedometer, an accelerator pedal, means dependent upon actuation of said clutch control and at will subject to positioning of said accelerator pedal during its initial range of movement for effecting different speed changes.

7. In an automotive vehicle gear shift, an engine having a throttle and an electric generator and battery charging circuit associated with and driven from said engine, said generator having a current output substantially proportional to engine speed through the lower ranges thereof, a transmission having a plurality of selectable gear ratios, a clutch interposed between said transmission and engine having a control therefor, a relay means for each of said gear ratios for selecting one or another of said gear ratios, each of said relay means including means sensitive to differing outputs of said generator for initiating operation of one or another of said relay means, and means operable by said clutch control for completing the initiated operation of one or another of said relay means.

8. In an automotive vehicle gear shift, an engine having a throttle control, a transmission having a plurality of selectable gear ratios, a clutch interposed between said transmission and engine having a control therefor, a relay means for each of said gear ratios for selecting one or another of said selectable gear ratios, and means associated with the throttle control, and each of said relay means and dependent upon operation of said clutch control to effect selection of one or another relay means by throttle control position.

9. In an automotive vehicle transmission, an engine and control therefor, a clutch and a control therefor, a transmission having a plurality of selectable gear ratios, means for engaging one or another of said gear ratios, a relay circuit for each of said gear ratios associated with said engaging means, means associated with said clutch control for establishing a source of power and operative in the clutch disengaged range of movement of said control, means dependent upon actuation of said engine control for initiating selection of one or another relay circuit and dependent upon the establishment of said power source, and means for effecting engagement of one or another of said gear ratios in response to selection of one or another of said relay circuits.

10. In an automotive vehicle transmission, an engine and control therefor, a clutch and a control therefor, a transmission having a plurality of selectable gear ratios, separate electrical means for effecting engagement of one or another of each of said gear ratios, a relay circuit for each of said gear ratios associated with said engaging means, means associated with said clutch control for establishing a source of power and operative in the clutch disengaged range of movement of said control, means dependent upon actuation of said engine control for initiating selection of one or another relay circuit and dependent upon the establishment of said power source, means for effecting engagement of one or another of said gear ratios in response to selection of one or another of said relay circuits, and relay means in series with each of said separate electrical means interlocking with the other relay circuits to positively prevent effecting engagement of the other.

11. In an automotive vehicle gear shift, a transmission having a plurality of selectable gear ratios, a clutch, and an engine throttle control, electro-magnetic means associated with each gear ratio for effecting selection thereof, relay means for each gear ratio and means for operating one or another relay by positioning the throttle control, a holding relay for each gear ratio, a switch operated by said clutch when in disengaged position, a holding relay means for each gear ratio operative in response to closure of said switch and its corresponding first-named relay means, a series circuit for each gear ratio comprising said electro-magnetic means and the corresponding holding relay, and a series relay in each of said series circuits for rendering the other series circuits inoperative.

12. In an automotive vehicle gear shift, a transmission having a plurality of selectable gear ratios, electro-magnetic means associated with each gear ratio for effecting selection thereof, a clutch, an engine throttle control, means associated with said throttle control and said electro-magnetic means for partially establishing circuits for selection of one or another gear ratio through said electro-magnetic means, and clutch controlled means completing establishment of said selection circuit.

13. In an automotive vehicle gear shift, a transmission having a plurality of selectable gear ratios, electro-magnetic means associated with each gear ratio for effecting selection thereof, a clutch, an engine throttle control, means associated with said throttle control and said electro-magnetic means for partially establishing circuits for selection of one or another gear ratio through said electro-magnetic means, clutch controlled means completing establishment of said selection circuit, means for opening said circuit upon completion of selection of said gear ratio, and clutch operated means for effecting restoration of all gear ratios to neutral upon disengagement thereof.

14. In an automotive vehicle gear shift having a plurality of forward gear ratios and a reverse gear ratio, selective relay means including an initiating relay for each gear ratio, a throttle control means having a plurality of substantially closed throttle positions, each adapted to close a circuit, a clutch and control therefor, a forward and reverse switch adapted to connect each of said circuit closing throttle control means to one of said initiating relays for the forward gear ratios, or for connecting at least one of said circuit closing throttle control means to the initiating relay for reverse gear ratio at will, and means responsive to said clutch control for completing actuation of a selective relay means corresponding to the connected initiating relay.

15. In an automotive vehicle gear shift having a plurality of forward gear ratios and a reverse gear ratio, selective relay means including an initiating relay for each gear ratio, a throttle control means having a plurality of substantially closed throttle positions, each adapted to close a circuit, a clutch and control therefor, a forward and reverse switcn adapted to connect each of said circuit closing throttle control means to one of said initiating relays for the forward gear ratios, or for connecting at least one of said circuit closing throttle control means to the initiating relay for reverse gear ratio at will, and means responsive to said clutch control for completing actuation of a selective relay means corresponding to the connected initiating relay, and a vehicle speed responsive switch adapted to bridge one of said circuit closing means during one range of speed, and adapted to bridge another of said circuit closing means during another range of speed.

16. In an automotive vehicle gear shift having a plurality of forward gear ratios and a reverse gear ratio, a clutch selective relay means including an initiating relay for each gear ratio, a throttle control means having a plurality of substantially closed throttle positions, each adapted to close a circuit, a forward and reverse switch adapted to connect each of said circuit closing throttle control means to one of said initiating relays for the forward gear ratios, or for connecting at least one of said circuit closing throttle control means to the initiating relay for reverse gear ratio at will, and means for opening said switch circuits responsive to clutch engagement.

17. In an automotive vehicle gear shift, a transmission having a plurality of selectable gear ratios, and a pair of gear shift rails for effecting a selected gear ratio, a clutch, a throttle control, means responsive to the positioning of said throttle control for partially completing the selection of a gear ratio, and means responsive to clutch pedal disengaged position for effecting a completion of selection and effecting a gear change, said last-named means requiring coordination of clutch position to select the one or the other of said shift rails for effecting the selected gear ratio.

18. In an automotive vehicle gear shift, a transmission having a plurality of selectable gear ratios, a clutch, and an engine throttle control, electro-magnetic means associated with each gear ratio for effecting selection thereof, relay means for each gear ratio and means for operating one or another relay by positioning the throttle control, a holding relay for each gear ratio, a switch operated by said clutch when in disengaged position, a holding relay means for each gear ratio operative in response to closure of said switch and its corresponding first-named relay means, a series circuit for each gear ratio comprising said electro-magnetic means and the corresponding holding relay, and a series relay in each of said series circuits for rendering the other series circuits inoperative, and signal lights associated with one or more of said holding relays to indicate energization thereof.

19. In an automotive vehicle gear shift, a transmission having a plurality of selectable gear ratios, power means associated with each gear ratio for effecting selection thereof, a clutch, an engine throttle control, means responsive to the degree of actuation of said throttle control and said power means for partially establishing power control lines for selection of one or another gear ratio at will through said power means, and clutch controlled means completing establishment of said selection power control line.

20. In an automotive vehicle gear shift, an engine having a throttle and an electric generator associated with and driven from said engine, said generator having a power output substantially proportional to engine speed through the lower ranges thereof, a transmission having a plurality of selectable gear ratios, a clutch interposed between said transmission and engine and having a control therefor, means responsive to the generator power output and operation of the clutch control for selecting one or another of said gear ratios.

21. In an automotive vehicle gear shift, an engine having a throttle and a speed responsive device associated with and driven from said engine, a transmission having a plurality of selectable gear ratios, a clutch interposed between said transmission and engine and having a control therefor, means responsive to the speed responsive device and operation of the clutch control for selecting one or another of said gear ratios.

JAMES WALTER CAVES.